United States Patent
Camberlin et al.

(10) Patent No.: US 6,612,343 B2
(45) Date of Patent: *Sep. 2, 2003

(54) USE OF POLYMER COMPOSITIONS FOR COATING SURFACES, AND SURFACE COATINGS COMPRISING SUCH COMPOSITIONS

(75) Inventors: Yves Camberlin, Caluire (FR); Jacky Grenier, Vignieu (FR); Stéphane Poncet, St Foy Lyon (FR); Anthony Bonnet, Passins (FR); Jean-Pierre Pascault, Villeurbanne (FR); Henri Sautereau, Vaulx-En-Velin (FR)

(73) Assignee: Institut Francais du Petrole, Rueil Malmaison (FR)

( * ) Notice: Subject to any disclaimer, the term of this patent is extended or adjusted under 35 U.S.C. 154(b) by 0 days.

This patent is subject to a terminal disclaimer.

(21) Appl. No.: 10/081,233

(22) Filed: Feb. 25, 2002

(65) Prior Publication Data

US 2002/0150762 A1 Oct. 17, 2002

Related U.S. Application Data

(63) Continuation of application No. 09/235,337, filed on Jan. 22, 1999, now Pat. No. 6,349,747.
(60) Provisional application No. 60/084,669, filed on May 7, 1998.

(30) Foreign Application Priority Data

Jan. 22, 1998 (FR) .............................. 98 00758

(51) Int. Cl.$^7$ ......................... B32B 27/38; B32B 15/08; B32B 1/08; F16L 9/14
(52) U.S. Cl. ....................... 138/141; 428/418; 428/35.7; 428/35.8; 428/36.9; 428/457; 428/473.5; 428/413; 138/145; 138/146

(58) Field of Search .............................. 428/411.1, 413, 428/416, 418, 457, 473.5, 500, 35.7, 35.8, 34.1, 35.2, 36.9, 36.91; 525/396, 523; 138/141, 145, 146

(56) References Cited

U.S. PATENT DOCUMENTS

| | | | | |
|---|---|---|---|---|
| 4,304,889 A | | 12/1981 | Waddill | 525/514 |
| 4,579,885 A | * | 4/1986 | Domeier et al. | 523/400 |
| 4,962,162 A | | 10/1990 | Kosuda et al. | 525/422 |
| 5,502,102 A | | 3/1996 | Nazareth | 524/494 |
| 5,512,119 A | * | 4/1996 | Takezawa et al. | 156/171 |
| 5,599,628 A | * | 2/1997 | Gardner | 428/413 |
| 5,612,401 A | | 3/1997 | Brown et al. | 524/413 |
| 5,723,551 A | | 3/1998 | Brown et al. | 525/391 |
| 5,755,266 A | | 5/1998 | Aanonsen et al. | 138/174 |
| 6,349,747 B1 | * | 2/2002 | Camberlin | 138/141 |

* cited by examiner

Primary Examiner—Paul Thibodeau
Assistant Examiner—Sheeba Ahmed
(74) Attorney, Agent, or Firm—Millen White Zelano & Branigan

(57) ABSTRACT

The invention describes the use of compositions containing at least one thermoplastic polymer and an epoxy resin modified by at least one aromatic polyamine to coat surfaces, especially pipes through which oil is transported. The polymer compositions used contain at least one thermoplastic polymer which is preferably amorphous selected from the group formed by polysulphones, polyetherimides and polyphenylene esters and at least one epoxy resin modified by at least one aromatic polyamine containing at least two primary amine groups in its molecule. Different layers of polymers are deposited on different types of surface, more particularly as internal and external coatings for conduits. The invention also provides a surface coating comprising such compositions. Multi-layer coatings are also produced.

23 Claims, No Drawings

USE OF POLYMER COMPOSITIONS FOR COATING SURFACES, AND SURFACE COATINGS COMPRISING SUCH COMPOSITIONS

This application is a continuation of Ser. No. 09/235,337, filed Jan. 22, 1999, now U.S. Pat. No. 6,349,747, which claims the benefit of No. 60/084,669, filed May 7, 1998.

During the course of a study on surface coatings, the Applicant was concerned with polymer compositions. Following this work, compositions of particular interest for surface coatings were developed, these compositions containing at least one thermoplastic polymer which is usually amorphous or of low crystallinity, and at least one epoxy resin modified by at least one aromatic polyamine.

The present invention concerns the use of these compositions to coat metal or other surfaces, for example for receptacles or conduits. These compositions are particular suitable for protecting surfaces, in particular metal surfaces. These compositions are used to coat conduits and pipelines in particular, especially metal conduits and steel pipelines.

Pipelines are metal tubes, often formed from steel, essentially used in wells to transport crude oil and natural gas, but any type of fluid could be transported by such pipelines. The internal surface of the pipeline is corroded by the transported fluid. When the transported fluid is oil, the sulphur-containing compounds contained in the oil are the main causes of the corrosion. When drilling offshore, the external surface of the pipeline is also corroded by sea water.

The principal problem with depositing a polymer on a metal surface, for example the external and/or internal surface of a pipeline, for example of steel, is the behaviour of the polymer when it is subjected to heat stress. Even if the oil is cooled before transporting it, the pipeline is often heated to a temperature of about 50° C. to 200° C. by contact with hot oil. Certain polymers, for example polypropylene, tend to distort and no longer adhere to the metal once the temperature exceeds 130° C. Other polymers, such as polyetherimides or polysulphones, adhere at high temperatures but their application temperature (at which it is deposited on the metal) is higher, about 360° C. Further, metals, in particular steel—frequently used in the production of pipelines—, may undergo phase distortions from a temperature of about 250° C., and certain of their mechanical and physical properties can be altered.

In addition, good adhesion of the polymer at a higher temperature enables the oil to be transported without the need to cool it, or at least it only needs to be cooled to a lesser extent. At a relatively high temperature, oil is less viscous and therefore easier to transport.

The use of the polymer compositions of the present invention overcomes the above disadvantages; in particular, such use produces pipelines with a coating with good adhesion, good stiffness, and good resistance to sea water. Further, the properties of the polymer compositions used are only slightly altered when these compositions are aged.

The polymer compositions used contain at least one thermoplastic polymer, usually having a high glass transition temperature and preferably being amorphous or of low crystallinity, usually selected from the group formed by polysulphones, polyetherimides and polyphenylene ethers and at least one epoxy resin modified by at least one aromatic polyamine containing at least two primary amine groups in its molecule; preferably, sterically hindered polyamines are selected, i.e., they contain at least one alkyl substituent containing 1 to 12 carbon atoms located alpha to one of the amine groups. In the remainder of the description, the polyamines described above are termed "aromatic polyamines".

Preferably, the polymer compositions used contain at least one thermoplastic polymer in an amount of about 15% to 98% by weight, more preferably 30% to 70% by weight, with respect to the total composition weight, and at least one epoxy resin modified by at least one aromatic polyamine in an amount of about 2% to 85% by weight, preferably about 30% to 70% by weight, with respect to the total composition weight.

The term "polysulphone" may be the source of an ambiguity. The first polymer of commercial importance with a base unit containing a sulphone group —$SO_2$— was, the polymer sold by AMOCO under the trade name UDEL. Because of this, this particular polysulphone is often designated by the generic term polysulphone. In the present description, the term "polysulphone" is used in its generic sense, and not just the limiting sense of a UDEL type polysulphone.

The polysulphones used in the polymer compositions of the invention are preferably aromatic polysulphones, more preferably UDEL type polysulphones, RADEL A polysulphone type polyether-sulphones sold by AMOCO, and RADEL R polysulphone type polyphenylene sulphones also sold by AMOCO.

The polyetherimides used in the polymer compositions are preferably ULTEM type polyetherimides sold by General Electric Plastics.

The polyphenylene ethers used in the polymer compositions are preferably PPE 800 type polyphenylene ethers sold by General Electric Plastics.

As used in the present invention, the thermoplastic polymers can be used alone, mixed with each other or mixed with other polymers such as aromatic polyetherketones or polyphenylene sulphides. Polymer compositions comprising aromatic polyetherketones contain about 1% to 50% by weight thereof with respect to the total weight of thermoplastic polymers. Polymer compositions comprising polyphenylene sulphides contain about 1% to 50% by weight thereof with respect to the total weight of thermoplastic polymers.

The epoxy resins modified by at least one aromatic polyamine, preferably sterically hindered, used in the polymer compositions are epoxy resins formed from at least one polyepoxide containing at least two epoxy groups in its molecule and at least one aromatic polyamine containing at least two primary amine groups in its molecule, and at least one alkyl substituent containing 1 to 12 carbon atoms located alpha to one of the amine groups, the mole ratio of the amine to the epoxy being such that each amine group corresponds to 1.6 to 2.6 epoxy groups.

The aromatic polyamines are selected for their low reactivity and for their non toxic nature.

The epoxy resin can be selected from the group formed by the following commercially available resins: the diglycidylether of bis-phenol-A or bis-phenol F, bis-phenol formol resin, phenol-novolac resin, cycloaliphatic resins, tri- or tetrafunctional resins, resins formed from triglycidylether-isocyanurate and/or triglycidylether-cyanurate and/or triglycidyl-cyanurate and/or triglycidyl-isocyanurate or mixtures of at least two of these resins.

The epoxy resins obtained from the epoxy resins cited in U.S. Pat. No. 4,921,047 can also be used in the present invention.

The aromatic polyamines used in the polymer compositions include a first series of aromatic amines comprising a single aromatic ring such as 3,5-diethyl-2,4-dinitrotoluene, 3,5-diethyl-2,6-diaminotoluene and mixtures of these two isomers. Usually, a mixture of these two isomers generally known as DETDA is used.

In a second series of amines used, amines containing at least two aromatic rings can be considered, these two aromatic rings generally being connected to each other by a bivalent linear or branched hydrocarbon residue containing 1 to 18 carbon atoms. These two aromatic rings are either connected via a bivalent alkyl group or are connected one to the other via a bivalent linear or branched hydrocarbon residue containing 6 to 18 carbon atoms and containing an aromatic ring.

The amine can also contain at least one substituent selected from the group formed be fluorine, iodine, bromine and chlorine. It preferably contains at least two alkyl substituents, each being alpha either side of an amino group.

When the two aromatic rings are connected via a bivalent alkyl residue, this residue is preferably a methylidene group which is non substituted or substituted by at least one radical selected from alkyl radicals and halogenoalkyl radicals containing 1 to 3 carbon atoms. As an example, this alkyl residue is selected from the group formed by the methylidene group, the isopropylidene group, the halogenoisopropylidene groups, and the hexafluoroisopropylidene group. In this case, the amine is preferably selected from the group formed by:
4,4'-methylene-bis(2,6-dimethylaniline) or M-DMA;
4,4'-methylene-bis(2-isopropyl-6-methyl-aniline) or M-MIPA;
4,4'-methylene-bis(2,6-diethylaniline) or M-DEA;
4,4'-methylene-bis(2,6-diisopropylaniline) or M-DIPA; and
4,4'-methylene-bis(3-chloro-2,6-diethylaniline) or M-CDEA.

Of these amines, 4,4'-methylene-bis(2,6-diethylaniline) and 4,4'-methylene-bis(3-chloro-2,6-diethylaniline) are of particular interest.

When the amine contains two aromatic rings which are connected to each other via a bivalent hydrocarbon residue which may or may not be substituted, containing 6 to 18 carbon atoms and containing an aromatic ring, it is preferably selected from the group formed by:
4,4'-(phenylene-diisopropyl)-bis(2,6-dimethyl-aniline);
4,4'-(phenylene-diisopropyl)-bis(2,6-diethyl-aniline);
4,4'-(phenylene-diisopropyl)-bis(2,6-dipropyl-aniline);
4,4'-(phenylene-diisopropyl)-bis(2,6-diisopropyl-aniline);
4,4'-(phenylene-diisopropyl)-bis(2,6-dimethyl-3-chloro-aniline);
4,4'-(phenylene-diisopropyl)-bis(2,6-diethyl-3-chloro-aniline);
4,4'-(phenylene-diisopropyl)-bis(2,6-dipropyl-3-chloro-aniline);
4,4'-(phenylene-diisopropyl)-bis(2,6-diisopropyl-3-chloro-aniline);
3,3'-(phenylene-diisopropyl)-bis(2,6-dimethyl-aniline);
3,3'-(phenylene-diisopropyl)-bis(2,6-diethyl-aniline);
3,3'-(phenylene-diisopropyl)-bis(2,6-dipropyl-aniline);
3,3'-(phenylene-diisopropyl)-bis(2,6-dimethyl-3-chloro-aniline);
3,3'-(phenylene-diisopropyl)-bis(2,6-diethyl-3-chloro-aniline);
3,3'-(phenylene-diisopropyl)-bis(2,6-dipropyl-3-chloro-aniline);
3,3'-(phenylene-diisopropyl)-bis(2,6-diisopropyl-aniline); and
3,3'-(phenylene-diisopropyl)-bis(2,6-diisopropyl-3-chloro-aniline).

The polymer compositions of the present invention can also contain catalysts which are active for the reaction between the epoxy resins and the sterically hindered aromatic polyamines. The most frequently used active catalysts are imidazoles, tertiary amines and boron trifluoride based complexes. Additives selected from the group formed by antioxidants, pigments, adhesion promoters, heat stabilisers and organic, mineral or metallic fillers can also be added.

These polymer compositions are preferably prepared without a solvent in the molten state at a temperature of about 100° C. to 250° C., preferably about 150° C. to 200° C. This preparation is preferably carried out using a mixer such as a twin screw extruder. In this preferred mode of preparation, the epoxy resins, aromatic polyamines and any additives are introduced into the mixer in the form of a premix to which the thermoplastic polymer is added; each reactant can also be separately introduced into the mixer via different inlet zones or via a single inlet zone. It is also possible to mix the thermoplastic polymers and epoxy resins first, then to acid the aromatic polyamine. It is also possible to introduce the aromatic polyamine into the mixer into a zone close to the zone for recovering the polymer composition.

Once the mixture has been produced, the polymer composition is formed then preferably cured. Curing generally consists of heating the composition to a temperature of about 200° C. to 250° C., for example, for a period of about 10 minutes to 12 hours. It is preferably carried out in an oven.

Layers of polymer compositions can thus be deposited on different types of conduits, in particular on pipelines produced from metal, more particularly from steel. Internal and external coatings can be formed. Different application methods have been studied. Of the possible application methods, dusting and extrusion deposition methods are preferred. The thickness of the polymer composition layers formed is generally about $10 \times 10^{-6}$ m (10 micrometers) to $1 \times 10^{-2}$ m (1 centimeter), preferably about $50 \times 10^{-6}$ m (50 micrometers) to $5 \times 10^{-3}$ m (5 millimeters).

Uses for polymer compositions for coating surfaces with multi-layers have also been tested. Up to 5 superimposed layers have been produced. Preferably, 2 to 4 layers were superimposed in the tests.

Thus one polymer composition layer containing at least one thermoplastic polymer and at least one epoxy resin modified by at least one polyamine was deposited on the metal, in particular on steel or on steel coated with an anti-corrosion primer and/or an adhesion promoter. Deposits on other materials, in particular on other polymers, were also studied.

Uses for polymer compositions for coating surfaces with multi-layers were also tested. Thus one (or more) layers of polymer composition containing at least one thermoplastic polymer and at least one epoxy resin modified by at least one polyamine had deposited on it a layer of a polymer composition containing at least one thermoplastic polymer and at least one epoxy resin modified by at least one aromatic polyamine, the layers containing identical or different thermoplastic polymers in identical or different proportions.

A layer of a polymer composition containing at least one thermoplastic polymer and at least one epoxy resin modified by at least one aromatic polyamine has also had deposited on it reactive polymers with good adhesion to the layers onto which they are deposited, such as polymers with one or more reactive functions for example epoxy, alcohol, amine, acid, anhydride, thiol or polyolefins with functions which react with epoxy or polar functions, or a modified polyolefin P1 containing at least one succimide ring substituted on the nitrogen by a reactive group, said ring being supported either by the main chain or by the side chain. It is also possible to use the product resulting from the reaction of this modified polyolefin with at least one polyepoxide containing at least two epoxy groups in its molecule.

This polyolefin P1 can be defined as being the product resulting from the reaction of at least one polyolefin with at least one compound containing a maleimide ring substituted on the nitrogen by a reactive group with formula —R— $(X)_n$ where X represents a reactive group, n represents a number equal to 1 or more and R is a residue containing at least one carbon atom. Usually, n equals 1 and in this case the compound containing a maleimide ring used in the present invention is represented by the formula (I) below:

FORMULA I

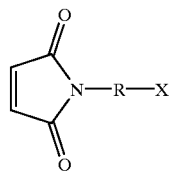

The reactive group —X is normally selected from a hydroxyl group, a carboxyl group, a carboxamide group, a carboxylic acid halide group, a thiol group, a thio-carboxyl group, an amine group, a halogen, an epoxy group and an esterified carboxyl group where the ester portion comprises a reactive group. When a plurality of groups —X are present, they can be identical or different.

The reactive group —X is usually selected from groups which can react with epoxy functions by oxirane ring opening. Usually, compounds containing a reactive group selected from the carboxyl group, the carboxamide group, an acid halide group, for example a carboxylic acid halide group, are used. The carboxyl group is preferred.

The group —R— is normally selected from saturated or unsaturated, substituted or non substituted aliphatic hydrocarbon groups, and substituted or non substituted aromatic groups. Generally, non substituted groups are preferred and usually the groups contain at least one aromatic ring. An example of a group which is often used is a benzene group ortho, meta or para to the nitrogen atom and to a reactive group —X. Usually, the para or meta form is used.

The polyolefins used to form this layer can be any polyolefin which is well known to the skilled person. Preferably, polyolefins obtained from at least one unsaturated monomer containing one or more unsaturated bonds is used, usually selected from the group formed by ethylene, propene, butenes and norbornenes. Thus these polyolefins can be formed by homopolymerisation or copolymerisation of at least two monomers.

These layers of polymer compositions with one or more reactive functions as defined( above are generally about $1\times10^{-6}$ m (1 micrometer) to $500\times10^{-6}$ m (500 micrometers) thick, preferably about $100\times10^{-6}$ m (100 micrometers) to $400\times10^{-6}$ m (400 micrometers) thick.

A preferred use for the polymer compositions containing at least one thermoplastic polymer and at least one epoxy resin modified by at least one aromatic polyamine for coating the external surfaces of conduits consists of forming the following multi-layer. At least one first layer containing at least one thermoplastic polymer and at least one epoxy resin modified by at least one aromatic polyamine is directly deposited on the conduit—or onto the conduit after depositing, an anti-corrosion primer and/or an adhesion promoter. On this layer, a second layer of the polymer defined above is deposited, having one or more reactive functions and with good adhesion to the first layer. Finally, this system has deposited on it a layer of commercially available polymer selected from the group formed by polyolefins, such as polyethylenes and polypropylenes, and with good compatibility with the second layer: as an example, a layer of commercially available polyethylene will be deposited on a layer of modified polyethylene—with at least one reactive function.

This last layer can be in the form of a solid or it can be cellular. Further, it is generally about $10^{-3}$ m (1 millimeter) to about $10\times10^{-2}$ m (10 centimeters) thick.

More generally, at least one polymer composition containing at least one thermoplastic polymer and at least one epoxy resin modified by at least one aromatic polyamine can be used as an intermediate layer between a surface and a layer of a thermoplastic polymer composition containing at least two distinct polymers at least one of which is a polymer comprising at least one reactive function, and at least one modified polyolefin containing at least one succimide ring substituted on the nitrogen by a reactive group, said ring being supported either by the main chain or by the side chain.

Of the methods for depositing these multi-layer coatings, one preferred method consists of depositing a layer of a polymer composition containing at least one thermoplastic polymer and at least one epoxy resin modified by at least one aromatic polyamine on a support at the application temperature for said polymer composition, then depositing on this layer a further layer of a polymer composition selected from those defined above at its application temperature. After depositing each layer it can be cured at about 200° C. to 250° C., for a period of about 10 minutes to 12 hours. Curing can also be carried out after depositing all of the layers onto the coating. Preferably, curing is carried out after depositing all of the layers, this implementation thus achieving good cross linking of the layers between each other.

The present invention also concerns surface coatings comprising at least one thermoplastic polymer preferably selected from the group formed by polyetherimides, polysulphones and polyphenylene ethers and at least one epoxy resin modified by at least one aromatic polyamine containing at least two primary amine groups in its molecule, the epoxy resin being formed from at least one polyepoxide containing at least two epoxy groups in its molecule and the molar ratio of the aromatic polyamine to the epoxy resin being such that each amine group corresponds to 1.6 to 2.6 epoxy groups.

The invention also concerns multi-layer surface coatings comprising at least two identical or different layers in which at least one first layer contains at least one thermoplastic polymer preferably selected from the group formed by polyetherimides, polysulphones and polyphenylene ethers and at least one epoxy resin modified by at least one aromatic polyamine as defined above, and at least one second layer which is identical or different to said first layer, preferably selected from the group formed by the reactive polymers described above and the modified polyolefins described above, or a mixture of these two product types. In the present description, in the case of coatings comprising at least two layers, the term "first layer" does not imply that this layer is that which is in direct contact with the surface to be coated.

The following examples illustrate the invention without limiting its scope.

The polymer compositions in the following examples were prepared using a twin screw extruder from CLEXTRAL; this extruder comprised a plurality of positions for introducing the reactants to be mixed. For these examples, the epoxy resin and aromatic polyamine were first mixed; this mixture will hereinafter be termed the "premix". The thermoplastic polymers were introduced via an inlet zone and the premix was introduced via a further inlet zone. The rate for the premix was constant, and was introduced using a gear pump. In contrast, the thermoplastic polymers were introduced using a gravimetric metering hopper which enabled the rate of the thermoplastic polymers to be varied, and thus polymer compositions with different modified resin/thermoplastic polymer ratios could be produced.

The thermoplastic polymers were introduced into the extruder's inlet zone at the end opposite to the zone for recovering the polymer composition. The temperature in this inlet zone was 100° C. They were then entrained in a second zone where the temperature was 150° C. and into which the premix was introduced. These reactants were then entrained by the twin screw extruder, with the temperature inside the extruder slowly increasing to attain 185° C. and the extruder outlet.

EXAMPLE 1

In this example, mixtures of polymer compositions comprising a polyetherimide and a modified epoxy resin were prepared.

The modified epoxy resin comprised 8.016 kg of the diglycidyl ether of bis-phenol-A (DGEBA), sold under reference number LY556 by CIBA-GEIGY, and 3.984 kg of 4,4'-methylene-bis(3-chloro-2,6-diethylaniline) (MCDEA), sold by LONZA.

Before its introduction into the extruder, this mixture was heated to 80° C. with stirring. The progress of the reaction of this mixture was measured by exclusion chromatography. The reactivity was very low: 5 hours at 60° C. resulted in a 1% advance in the reaction.

The polyetherimide used was sold by General Electric Plastics with reference ULTEM 1000; its number average molecular mass was 26000 g/mol and its granulometry was 300 micrometers. Before its introduction into the extruder, the polyetherimide was kept in an oven at 120° C. for two hours.

The modified epoxy resin was introduced into the extruder at a constant rate of 2 kg/h using a gear pump. The polyetherimide was introduced at a rate of 4.75 kg/h using a gravimetric metering hopper to obtain a composition containing 30% by weight of modified epoxy resin, then at a rate of 2.00 kg/h to produce a composition containing 50% by weight of modified epoxy resin, and finally at a rate of 1.30 kg/h to produce a composition containing 60% by weight of modified epoxy resin, these percentages by weight of modified epoxy resin being calculated with respect to the total composition.

After extrusion, in order to carry out adhesion measurements using the lap shear test, these compositions were deposited on steel at a temperature corresponding to their application temperature—these temperatures are shown in Table 1a—, then cured at 220° C. for one hour.

These compositions were also pressed into a mould and cured at 220° C. for one hour to form them into test pieces with a view to determining their thermomechanical properties.

Measurements of steel adhesion, thermomechanical behaviour, resistance to sea water and ageing behaviour were carried out on the different compositions with a view to using them as external pipeline coatings.

The adhesion properties of the different compositions were determined using a lap shear method (ASTM D1002). To determine the adhesion, steel test pieces, previously cleaned with a stainless steel brush rotating at high speed, were glued. The adhesive surface was $(25.4 \times 10^{-3}) \times (12.7 \times 10^{-3})$ and the thickness of the adhesive joint was 125 micrometers. Gluing was carried out by simple contact at a temperature corresponding to the application temperature for each composition, then they were cured for 1 hour at 220° C. These adhesion tests using the lap shear method were carried out using an apparatus sold by INSTRON (INSTRON-1175) provided with a measuring head of 100 kN (kiloNewton) with an operating speed of $10^{-3}$ m/min.

Examples 1.2, 1.3 and 1.4 of Table 1a are in accordance with the invention; Example 1.1 is a comparative example; the composition of Example 1.1 contained no modified epoxy resin; it contained only a ULTEM 1000 polyetherimide. For the different compositions, the application temperature was determined along with the maximum load. The lap shear breaking stress was deduced by relating this maximum load to the adhesive surface area.

TABLE 1a

| Examples | 1.1 (comparative) | 1.2 (invention) | 1.3 (invention) | 1.4 (invention) |
|---|---|---|---|---|
| Modified epoxy resin (% by weight with respect to total composition) | 0 | 30 | 50 | 60 |
| Application temperature (° C.) | 320 | 230 | 210 | 200 |
| Maximum load (kiloNewton) | 6.1 | 6.5 | 6.8 | 7.4 |
| Stress at rupture (MPa) | 19 | 20 | 21 | 23 |

This first series of results shows that the compositions of the present invention were applied at a temperature of less than 250° C. The lap shear breaking stress for these compositions was very good: they were all more or less 20 MPa.

The loss of adhesion after 6 months at 150° C. in air was low. The lap shear breaking stress measured for the composition containing 30% of modified epoxy resin dropped from 20 MPa to 17 MPa.

The thermomechanical properties of the polymer compositions were determined using DMTA (Dynamic Mechanical Thermal Analysis), in sandwich mode. The measurements were carried out by moulding the different compositions into plates $2 \times 10^{-3}$ thick at a pressure of 5 MPa, then heating the mouldings to 220° C. for 1 hour. The elastic modulus and the tangent of the loss angle were measured as a function of temperature at a frequency of 1 Hz using a DMTA apparatus from Polymer Laboratories.

Glass transition temperatures (Tg) and the elastic modulus E' at 25° C., at 150° C. and at 175° C. were measured using the compositions defined in Table 1a. The results are shown in Table 1b.

TABLE 1b

| Examples | 1.1 (comparative) | 1.2 (invention) | 1.3 (invention) | 1.4 (invention) |
|---|---|---|---|---|
| Tg, ° C. | 220 | 218 | 215 | 215 |
| Modulus E' at 25° C., MPa | 1600 | 1600 | 1000 | 1250 |
| Modulus E' at 150° C., MPa | 1250 | 800 | 550 | 800 |
| Modulus E' at 175° C., MPa | 1200 | 600 | 350 | 300 |

The elastic modulus indicates the stiffness of the materials. These results show that up to 150° C. the stiffness of the polymer compositions was comparable to that of polyetherimide (Example 1.1). At 175° C., they still had sufficient stiffness for use as a coating.

A series of sea water resistance tests was also carried out. The compositions from Examples 1.1, 1.3 and 1.4 were moulded into $(50 \times 10^{-3}$ m$) \times (50 \times 10^{-3}$ m$) \times (2 \times 10^{-3}$ m$)$ plaques.

These test pieces were immersed in synthetic sea water contained in a sealed reactor heated to 160° C., at an absolute pressure of 0.62 MPa. Water absorption measurements were carried out by determining the variation in the weight of the test pieces after 3 months immersion. The results are shown in Table 1c.

TABLE 1c

| Examples | 1.1 (cormparative) | 1.3 (invention) | 1.4 (invention) |
|---|---|---|---|
| Water take-up (wt %) | 4.4 | 3.6 | 3.2 |
| Distortion | large | small | none |

The water take-up in the compositions of the invention was small. Increasing the quantity of epoxy resin reduced water take-up. Further, these compositions suffered little or no distortion. After 3 months immersion, the test piece coatings were practically entirely unchanged.

EXAMPLE 2

In this example, mixtures of polymer compositions comprising a polyphenylene sulphone and a modified epoxy resin were prepared.

The modified epoxy resin comprised 8.016 kg of the diglycidyl ether of bis-phenol-A (DGEBA), sold under reference number LY556 by CIBA-GEIGY, and 3.984 kg of MCDEA sold by LONZA. Before its introduction into the extruder, this mixture was heated to 80° C. with stirring. The progress of the reaction of this mixture was measured by exclusion chromatography. The reactivity was very low: 5 hours at 60° C. resulted in a 1% advance in the reaction.

The polyphenylene sulphone used was RADEL R sold by AMOCO.

The modified epoxy resin was introduced into the extruder at a constant rate of 2 kg/h using a gear pump. The polyphenylene sulphone was introduced at a rate of 2.00 kg/h using a gravimetric metering hopper to obtain a composition containing 50% by weight of modified epoxy resin, then at a rate of 1.10 kg/h to produce a composition containing 65% by weight of modified epoxy resin. These percentages by weight of modified epoxy resin were calculated with respect to the total composition.

After extrusion, in order to carry out adhesion measurements using the lap shear test, these compositions were deposited on steel at a temperature corresponding to their application temperature—these temperatures are shown in Table 2a—, then cured at 220° C. for one hour. To determine their thermomechanical properties, these compositions were pressed into a mould then cured at 220° C. for one hour to form them into test pieces.

The adhesion properties of the different compositions were determined by means of a lap shear test (ASTM D1002) using the method described in Example 1.

Examples 2.2 and 2.3 of the following table are in accordance with the invention; Example 2.1 is a comparative example the composition of which contained no modified epoxy resin, but contained only a RADEL R type polyphenylene sulphone. For the different compositions, the application temperature was determined along with the maximum load. The lap shear breaking stress was deduced by relating this maximum load to the adhesive surface area.

TABLE 2a

| Examples | 2.1 (comparative) | 2.2 (invention) | 2.3 (invention) |
|---|---|---|---|
| Modified epoxy resin (% by weight with respect to total composition) | 0 | 50 | 65 |
| Application temperature (° C.) | 320 | 190 | 170 |
| Maximum load (kiloNewton) | 6.5 | 6.1 | 6.8 |
| Stress at rupture (MPa) | 20 | 19 | 21 |

This first series of results shows that the compositions of the present invention were applied at a temperature of less than 200° C. The lap shear breaking stress of these compositions was very good: they were all more or less 19 MPa.

The thermomechanical properties of the polymer compositions were determined by DMTA in sandwich mode using the same process as in Example 1.

Glass transition temperatures (Tg) and the elastic modulus E' at 25° C., 150° C. and at 175° C. were measured using the compositions defined in Table 2a. The results are shown in Table 2b.

TABLE 2b

| Examples | 2.1 (comparative) | 2.2 (invention) | 2.3 (invention) |
|---|---|---|---|
| Tg, ° C. | 220 | 205 | 200 |
| Modulus E' at 25° C., MPa | 1200 | 1100 | 1300 |
| Modulus E' at 150° C., MPa | 1050 | 850 | 850 |
| Modulus E' at 175° C., MPa | 1000 | 700 | 650 |

The elastic modulus indicates the stiffness of the materials. These results show that even when they were heated to quite a high temperature, the stiffness of these polymer compositions was sufficient for use as a coating.

A series of sea water resistance tests was also carried out. The compositions from Examples 2.1 and 2.2 were moulded into $(50 \times 10^{-3}$ m$) \times (50 \times 10^{-3}$ m$) \times (2 \times 10^{-3}$ m$)$ plaques. These test pieces were immersed in synthetic sea water contained in a sealed reactor heated to 160° C., at an absolute pressure of 0.62 MPa. Water absorption measurements were carried out by determining the variation in the weight of the test pieces after 3 months immersion.

TABLE 2c

| Examples | 2.1 (comparative) | 2.2 (invention) |
|---|---|---|
| Water take-up (wt %) | 2.6 | 2 |
| Distortion | none | none |

The water take-up in the compositions of the invention was low. The increase in the quantity of epoxy resin reduced water take-up, and this composition suffered little or no distortion. After 3 months immersion, the test piece coating was unchanged.

EXAMPLE 3

In this example, a polymer composition comprising a polyphenylene ether and a modified epoxy resin was prepared.

The modified epoxy resin comprised 8.016 kg of the diglycidyl ether of bis-phenol-A (DGEBA), sold under reference number LY556 by CIBA-GEIGY, and 3.984 kg of MCDEA sold by LONZA.

Before its introduction into the extruder, this mixture was heated to 80° C. with stirring. The progress of the reaction of this mixture was measured by exclusion chromatography. The reactivity was very low: 5 hours at 60° C. resulted in a 1% advance in the reaction.

The polyphenylene ether used is sold by General Electric Plastics under reference PPE 800; its number average molecular mass is 12000 g/mol.

The modified epoxy resin was introduced into the extruder at a constant rate of 2 kg/h using a gear pump. The polyphenylene ether was introduced at a rate of 3.00 kg/h using a gravimetric metering hopper to obtain a composition containing 40% by weight of modified epoxy resin. The percentage by weight of modified epoxy resin was calculated with respect to the total composition.

After extrusion, in order to carry out adhesion measurements using the lap shear test, this composition was deposited on steel at a temperature corresponding to its application temperature—this temperature is shown in Table 3a—, then cured at 220° C. for one hour.

To determine its thermomechanical properties, this composition was pressed into a mould then cured at 220° C. for one hour to form a test piece.

The adhesion properties of the composition were determined using a lap shear test (ASTM D 1002) using the method described in Example 1.

Example 3.2 of the following table was in accordance with the invention. For Example 3.2, the application temperature was determined along with the maximum load. The lap shear breaking stress was deduced by relating this maximum load to the adhesive surface area.

Example 3.1 is a comparative example in which the composition contained no modified epoxy resin, but only contained a type PPE 800 polyphenylene ether. However, the tests showed that when the application temperature reached 300° C., the composition degraded: it oxidised spontaneously on contact with the oxygen in the air and hardened. Further, this composition had no adhesive properties when applied at temperatures of less than 300° C. For this reason, the maximum load could not be determined for this composition.

TABLE 3a

| Examples | 3.1 (comparative) | 3.2 (invention) |
| --- | --- | --- |
| Modified epoxy resin (% by weight with respect to total composition) | 0 | 40 |
| Application temperature (° C.) | 300 | 220 |
| Maximum load (kiloNewton) | 0 | 3.9 |
| Stress at rupture (MPa) | 0 | 12 |

Composition 3.2 was applied at a temperature of 220° C. The lap shear breaking stress of these compositions was good: it was 12 MPa.

While composition 3.1 was difficult to apply at atmospheric pressure in ambient air, it was possible to produce the test pieces necessary to determine the thermomechanical properties of this composition.

The thermomechanical properties of the polymer compositions were determined by DMTA in sandwich mode using the same process as in Example 1.

Glass transition temperatures (Tg) and the elastic modulus E' at 25° C., 150° C. and at 175° C. were measured using the compositions defined in Table 3a. The results are shown in Table 3b.

TABLE 3b

| Examples | 3.1 (comparative) | 3.2 (invention) |
| --- | --- | --- |
| Tg, ° C. | 210 | 205 |
| Modulus E' at 25° C., MPa | 1200 | 1400 |
| Modulus E' at 150° C., MPa | 850 | 850 |
| Modulus E' at 175° C., MPa | 750 | 650 |

The elastic modulus indicates the stiffness of the materials. These results show that even when they were heated to quite a high temperature, the stiffness of the polymer composition of the invention was sufficient for use as a coating.

A series of sea water resistance tests was also carried out. The compositions from Examples 3.1 and 3.2 were moulded into $(50 \times 10^{-3} \text{ m}) \times (50 \times 10^{-3} \text{ m}) \times (2 \times 10^{-3} \text{ m})$ plaques. These test pieces were immersed in synthetic sea water contained in a sealed reactor heated to 160° C., at an absolute pressure of 0.62 MPa. Water absorption measurements were carried out by determining the variation in the weight of the test pieces after 3 months immersion.

TABLE 3c

| Examples | 3.1 (comparative) | 3.2 (invention) |
| --- | --- | --- |
| Water take-up (wt %) | 0.5 | 1 |
| Distortion | none | none |

The water take-up in the compositions of the invention was low. This composition suffered no distortion. After 3 months immersion, the test piece coating was unchanged.

EXAMPLE 4

In this example, mixtures of polymer compositions comprising a polyetherimide, a polyphenylene ether and a modified epoxy resin were prepared.

The modified epoxy resin comprised 8.016 kg of the diglycidyl ether of bis-phenol-A (DGEBA), sold under reference number LY556 by CIBA-GEIGY, and 3.984 kg of MCDEA sold by LONZA.

Before its introduction into the extruder, this mixture was heated to 80° C. with stirring. The progress of the reaction of this mixture was measured by exclusion chromatography. The reactivity was very low: 5 hours at 60° C. resulted in a 1% advance in the reaction.

The polyetherimide used was sold by General Electric Plastics under the trade name ULTEM 1000. This polyetherimide was that used in Example 1 above. The polyphenylene ether used is sold by General Electric Plastics under the trade name PPE 800; its number average molecular weight is 12000 g/mol. This polyphenylene ether was that used in Example 3 of the present text.

The modified epoxy resin was introduced into the extruder at a constant rate of 2 kg/h using a gear pump. The thermoplastic polymers (polyetherimide and polyphenylene ether) were introduced via the same introduction zone, the quantity of polyetherimide being equal to the quantity of polyphenylene ether. These two polymers were introduced at a total rate of 2.00 kg/h using a gravimetric metering hopper, to obtain a composition containing 50% by weight of modified epoxy resin, then at a rate of 1 kg/h to produce a composition containing 67% by weight of modified epoxy resin. These percentages by weight of modified epoxy resin were calculated with respect to the total composition.

After extrusion, in order to carry out adhesion measurements using the lap shear test, these compositions were deposited on steel at a temperature corresponding to their application temperature—these temperatures are shown in Table 4a—, then cured at 220° C. for one hour.

To determine their thermomechanical properties, these compositions were pressed into a mould then cured at 220° C. for one hour to form them into test pieces.

The adhesion properties of the different compositions were determined using the ASTM D1002 method as described in Example 1.

Examples 4.2 and 4.3 of the following table are in accordance with the invention; Example 4.1 is a comparative example the composition of which contained no modified epoxy resin, but contained 50% by weight of PPE 800 type polyphenylene ether and 50% by weight of ULTEM 1000 type polyetherimide. For the different compositions, the application temperature was determined along with the maximum load. The lap shear breaking stress was deduced by relating this maximum load to the adhesive surface area.

TABLE 4a

| Examples | 4.1 (comparative) | 4.2 (invention) | 4.3 (invention) |
| --- | --- | --- | --- |
| Modified epoxy resin (% by weight with respect to total composition) | 0 | 50 | 67 |
| Application temperature (° C.) | 300 | 220 | 160 |
| Maximum load (kiloNewton) | 2.2 | 7.4 | 7.7 |
| Stress at rupture (MPa) | 7 | 23 | 24 |

This first series of results shows that the compositions of the present invention were applied at a temperature of less than 250° C. The lap shear breaking, stress of these compositions was very good: they were all more or less equal to 23 MPa.

The thermomechanical properties of the polymer compositions were determined by DMTA in sandwich mode using the same process as in Example 1.

Glass transition temperatures (Tg) and the elastic modulus E' at 25° C., 150° C. and at 175° C. were measured using the compositions defined in Table 4a. The results are shown in Table 4b.

TABLE 4b

| Examples | 4.1 (comparative) | 4.2 (invention) | 4.3 (invention) |
| --- | --- | --- | --- |
| Tg, ° C. | 220 | 215 | 210 |
| Modulus E' at 25° C., MPa | 1100 | 1100 | 1100 |
| Modulus E' at 150° C., MPa | 1050 | 900 | 700 |
| Modulus E' at 175° C., MPa | 900 | 600 | 200 |

The elastic modulus indicates the stiffness of the materials. These results show that even when they were heated to quite a high temperature, the stiffness of these polymer compositions was sufficient for use as a coating.

EXAMPLE 5

A series of breaking stress tests were carried out on multi-layer compositions. A first layer of a composition containing a thermoplastic polymer and a modified epoxy resin was directly deposited onto a type XC12 carbon steel test piece; then a layer of graft polyethylene was deposited on the first layer. The graft polyethylene used in the following examples contained 99% of FINATHENE 3802® sold by FINA and 1% of an equimolar mixture of 4-maleimidobenzoic acid and ARALDITE GT 7071™, sold by CIBA-GEIGY. The first layer—100 micrometers thick—was applied by heating this first layer to its application temperature and maintaining that temperature for a period of a few minutes to about an hour—in the following tables, this variable is termed the "first layer cure time". The second layer—300 micrometers thick—was then deposited at 220° C., then this latter temperature was maintained for one hour. In the case described in Examples 5b and 5d, the test piece was first coated with an adhesion primer, then the two layers described above were deposited in succession.

EXAMPLE 5b

In this example, the first layer deposited directly on the test piece was formed from a mixture comprising a polyetherimide and a modified epoxy resin. The reactants and the operating method used were those described in Example 1 of the present description, but the cure time for the first layer was varied. The polyetherimide represented 60% by weight of the mixture and the modified epoxy resin represented 40% by weight of the mixture.

TABLE 5a

| Examples | 5a.1 | 5a.2 | 5a.3 |
| --- | --- | --- | --- |
| First layer cure time (minutes) | 10 | 30 | 60 |
| Maximum load (kiloNewton) | 3.8 | 3.7 | 1.1 |
| Breaking stress (MPa) | 12 | 12 | 3.5 |

It can be seen from these results that if good adhesion between the layers is to be obtained, the polymer layers must not be polymerised to too great an extent.

EXAMPLE 5b

This example used the same procedure as that for Example 5a, the first layer cure time being 10 minutes. The only difference was that the steel onto which the layers were coated was first treated with a thin layer—50 micrometers thick—of an epoxy primer formed from 2 moles of DGEBA to 1 mole of MCDEA, then pre-polymerised at 150° C., and the layers described above in Example 5a were deposited onto this primer. The tension test established a breaking stress of 12 MPa.

EXAMPLE 5c

In this example, the first layer deposited directly on the test piece was formed from a mixture comprising a RADEL A type polyether sulphone and a modified epoxy resin. The reactants to produce the modified epoxy resin and the operating method used were those described in Example 2 of the present description. The polyether sulphone represented 60% by weight of the mixture and the modified epoxy resin represented 40% by weight of the mixture.

TABLE 5c

| Example | 5c.1 | 5c.2 | 5c.3 |
|---|---|---|---|
| First layer cure time (minutes) | 10 | 30 | 60 |
| Maximum load (kiloNewton) | 3.7 | 3.2 | 1.6 |
| Breaking stress (MPa) | 11.6 | 10 | 5 |

EXAMPLE 5d

This example was carried out using the same procedure as that for Example 5c, the first layer cure time being 10 minutes. The only difference was that the steel onto which the layers were coated was first treated with a thin layer (50 micrometers thick) of an epoxy primer formed from 2 moles of DGEBA to 1 mole of MCDEA, then pre-polymerised at 150° C., and the layers described above in Example 5c were deposited onto this primer. The tension test established a breaking stress of 12 MPa.

The tension tests carried out on the coated steel test pieces described in Examples 5a to 5d show that the break was cohesive in nature, i.e., it did not occur between the layers but in the graft polyethylene layer. This demonstrates the good cohesion of the composition containing a thermoplastic polymer and a modified epoxy resin to steel, and the good cohesion of the layers between themselves. These tests were carried out using the method described in Example 1.

The preceding examples can be repeated with similar success by substituting the generically or specifically described reactants and/or operating conditions of this invention for those used in the preceding examples. Also, the preceding specific embodiments are to be construed as merely illustrative, and not limitative of the remainder of the disclosure in any way whatsoever.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A substrate coated with a polymer composition comprising at least one thermoplastic polymer selected from the group consisting of polyetherimides, polysulphones and polyphenylene ethers, wherein the polymer composition further comprises at least one polyphenylene sulphide in an amount of about 1%–50% by weight with respect to the total weight of thermoplastic polymers and at least one epoxy resin modified by at least one aromatic polyamine containing at least two primary amine groups in its molecule, the epoxy resin being formed from at least one polyepoxide containing at least two epoxy groups in its molecule and the epoxy resin having a molar ratio of the aromatic polyamine to the epoxy being such that each amine group corresponds to 1.6 to 2.6 epoxy groups; wherein said polymer composition is preparable from at least one thermoplastic polymer and at least one epoxy resin modified by at least one aromatic polyamine, without a solvent, in a molten state at a temperature of about 100° C. to 250° C.

2. A substrate according to claim 1, wherein the substrate comprises a metal or a metallic composition.

3. A substrate according to claim 1, wherein said at least one thermoplastic polymer is present in an amount of 30% to 70% by weight with respect to the total polymer composition weight.

4. An pipe for transporting oil comprising an external surface coated with a polymer composition comprising at least one thermoplastic polymer selected from the group consisting of polyetherimides, polysulphones and polyphenylene ethers wherein the polymer composition further comprises at least one polyphenylene sulphide in amount of about 1% to 50% by weight with respect to the total weight of thermoplastic polymers, and at least one epoxy resin modified by at least one aromatic polyamine containing at least two primary amine groups in its molecule, the epoxy resin being formed from at least one polyepoxide containing at least two epoxy groups in its molecule and the epoxy resin having a molar ratio of the aromatic polyamine to the epoxy being such that each amine group corresponds to 1.6 to 2.6 epoxy groups.

5. A pipe according to claim 4, comprising at least one aromatic polyamine containing at least two primary amine groups in its molecule and at least one alkyl substituent containing 1 to 12 carbon atoms located alpha to one of the amine groups.

6. A pipe according to claim 4, in which the quantity of thermoplastic polymers is about 15% to 98% by weight with respect to the total polymer composition weight and the quantity of epoxy resin modified by at least one aromatic polyamine is about 2% to 85% by weight with respect to the total polymer composition weight.

7. A pipe according to claim 4, in which the aromatic polyamine used is selected from the group consisting of aromatic amines containing a single aromatic ring and aromatic amines containing at least two aromatic rings, the two aromatic rings being connected to each other by a bivalent linear or branched hydrocarbon residue containing 1 to 18 carbon atoms.

8. A pipe according to claim 4 wherein said polymer composition further comprises at least one aromatic polyetherketone in an amount of about 1% to 50% by weight with respect to the total weight of thermoplastic polymers.

9. A pipe according to claim 4 wherein superposed over said coated surface is a layer of a thermoplastic polymer composition containing at least two distinct polymers, at least one polymer comprising at least one reactive function, and at least one modified polyolefin containing at least one succimide ring substituted at a nitrogen by said reactive group.

10. A pipe according to claim 4, wherein the pipe comprises a metal or a metallic composition.

11. A pipe for transporting oil comprising an internal surface coated with a polymer composition comprising at least one thermoplastic polymer selected from the group consisting of polyetherimides, polysulphones and polyphenylene ethers wherein the polymer composition further comprises at least one polyphenylene sulphide in an amount of about 1% to 50% by weight with respect to the total weight of thermoplastic polymers, and at least one epoxy resin modified by at least one aromatic polyamine containing at least two primary amine groups in its molecule, the epoxy resin being formed from at least one polyepoxide containing at least two epoxy groups in its molecule and the epoxy resin having a molar ratio of the aromatic polyamine to the epoxy being such that each amine group corresponds to 1.6 to 2.6 epoxy groups.

12. A pipe according to claim 11, wherein said at least one aromatic polyamine contains at least two primary amine groups in its molecule and at least one alkyl substituent containing 1 to 12 carbon atoms located alpha to one of the amine groups.

13. A pipe according to claim 11 wherein said at least one thermoplastic polymer is present in an amount of about 15% to 98% by weight with respect to the total polymer composition weight and the quantity of epoxy resin modified by at least one aromatic polyamine is present in an amount of about 2% to 85% by weight with respect to the total polymer composition weight.

14. A pipe according to claim 11 in which the aromatic polyamine is selected from the group consisting of aromatic amines containing a single aromatic ring and aromatic amines containing at least two aromatic rings, the two aromatic rings being connected to each other by a bivalent linear or branched hydrocarbon residue containing 1 to 18 carbon atoms.

15. A pipe according to claim 11 wherein said polymer composition further comprises at least one aromatic polyetherketone in an amount of about 1% to 50% by weight with respect to the total weight of thermoplastic polymers.

16. A pipe according to claim 11 wherein superposed over said coated surface is a layer of a thermoplastic polymer composition containing at least two distinct polymers, at least one polymer comprising at least one reactive function, and at least one modified polyolefin containing at least one succimide ring substituted at a nitrogen by said reactive group.

17. A pipe according to claim 11, wherein the pipe comprises a metal or a metallic composition.

18. A pipe for transporting oil comprising an external surface coated with a polymer composition comprising at least one thermoplastic polymer selected from the group consisting of polyetherimides, polysulphones and polyphenylene ethers wherein said at least one thermoplastic polymer is present in an amount of 30% to 70% by weight with respect to the total polymer composition weight, and at least one epoxy resin modified by at least one aromatic polyamine containing at least two primary amine groups in its molecule, the epoxy resin being formed from at least one polyepoxide containing at least two epoxy groups in its molecule and the epoxy resin having a molar ratio of the aromatic polyamine to the epoxy being such that each amine group corresponds to 1.6 to 2.6 epoxy groups.

19. A pipe according to claim 18, wherein the pipe comprises a metal or a metallic composition.

20. A pipe for transporting oil comprising an internal surface coated with a polymer composition comprising at least one thermoplastic polymer selected from the group consisting of polyetherimides, polysulphones and polyphenylene ethers wherein said at least one thermoplastic polymer is present in an amount of 30% to 70% by weight with respect to the total polymer composition weight, and at least one epoxy resin modified by at least one aromatic polyamine containing at least two primary amine groups in its molecule, the epoxy resin being formed from at least one polyepoxide containing at least two epoxy groups in its molecule and the epoxy resin having a molar ratio of the aromatic polyamine to the epoxy being such that each amine group corresponds to 1.6 to 2.6 epoxy groups.

21. A pipe according to claim 20, wherein the pipe comprises a metal or a metallic composition.

22. In a method of transporting oil through a pipe immersed in salt water comprising the step of passing the oil through the pipe, the improvement wherein the pipe comprises an external surface coated with a polymer composition comprising at least one thermoplastic polymer selected from the group consisting of polyetherimides, polysulphones and polyphenylene ethers wherein the polymer composition further comprises at least one polyphenylene sulphide in an amount of about 1% to 50% by weight with respect to the total weight of thermoplastic polymers, and at least one epoxy resin modified by at least one aromatic polyamine containing at least two primary amine groups in its molecule, the epoxy resin being formed from at least one polyepoxide containing at least two epoxy groups in its molecule and the epoxy resin having a molar ratio of the aromatic polyamine to the epoxy being such that each amine group corresponds to 1.6 to 2.6 epoxy groups.

23. In a method of transporting oil through a pipe immersed in salt water comprising the step of passing the oil through the pipe, the improvement wherein the pipe comprises an external surface coated with a polymer composition comprising at least one thermoplastic polymer selected from the group consisting of polyetherimides, polysulphones and polyphenylene ethers wherein said at least one thermoplastic polymer is present in an amount of 30% to 70% by weight with respect to the total polymer composition weight, and at least one epoxy resin modified by at least one aromatic polyamine containing at least two primary amine groups in its molecule, the epoxy resin being formed from at least one polyepoxide containing at least two epoxy groups in its molecule and the epoxy resin having a molar ratio of the aromatic polyamine to the epoxy being such that each amine group corresponds to 1.6 to 2.6 epoxy groups.

* * * * *